United States Patent
Carroll et al.

(10) Patent No.: US 12,262,117 B2
(45) Date of Patent: Mar. 25, 2025

(54) SENSOR CROPPED VIDEO IMAGE STABILIZATION (VIS)

(71) Applicant: Apple Inc., Cupertino, CA (US)

(72) Inventors: Patrick A. Carroll, Scotts Valley, CA (US); Ajay Ramesh, San Jose, CA (US); Ashwini Dwarakanath, Cupertino, CA (US); David A. Silverstein, Palo Alto, CA (US); David R. Pope, Campbell, CA (US); Michael W. Tao, San Jose, CA (US); Terence N. Tam, Santa Clara, CA (US); Vitanshu Sharma, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 17/933,941

(22) Filed: Sep. 21, 2022

(65) Prior Publication Data

US 2024/0098368 A1     Mar. 21, 2024

(51) Int. Cl.
*H04N 23/68*     (2023.01)
*G06T 7/38*     (2017.01)

(52) U.S. Cl.
CPC ........... *H04N 23/6845* (2023.01); *G06T 7/38* (2017.01)

(58) Field of Classification Search
CPC ...... G06T 7/38; H04N 23/45; H04N 23/6812; H04N 23/684; H04N 23/6842; H04N 23/6845; H04N 23/6811; H04N 23/683; H04N 25/443; H04N 25/75; H04N 25/78
See application file for complete search history.

(56) References Cited

U.S. PATENT DOCUMENTS

| | | | | |
|---|---|---|---|---|
| 8,798,387 | B2 * | 8/2014 | Yamada | H04N 23/6811 382/296 |
| 11,388,340 | B2 * | 7/2022 | Yamazaki | H04N 23/6812 |
| 2005/0179784 | A1 * | 8/2005 | Qi | H04N 23/68 348/208.1 |
| 2006/0017814 | A1 * | 1/2006 | Pinto | H04N 23/68 348/208.4 |
| 2012/0281922 | A1 * | 11/2012 | Yamada | G06T 7/246 382/201 |
| 2013/0308002 | A1 * | 11/2013 | Jiang | H04N 23/683 348/208.6 |
| 2016/0150158 | A1 * | 5/2016 | Hasan | H04N 23/6842 348/208.2 |
| 2021/0014399 | A1 * | 1/2021 | Yamazaki | H04N 25/443 |

* cited by examiner

*Primary Examiner* — Antoinette T Spinks
(74) *Attorney, Agent, or Firm* — Blank Rome LLP (57) ABSTRACT

Devices, methods, and non-transitory program storage devices are disclosed herein to perform predictive image sensor cropping operations to improve the performance of video image stabilization operations, especially for high resolution image sensors. According to some embodiments, the techniques include, for each of one or more respective images of a first plurality of images: obtaining image information corresponding to one or more images in the first plurality of images captured prior to the respective image; predicting, for the respective image, an image sensor cropping region to be read out from the first image sensor; and then reading out, into a memory, a first cropped version of the respective image comprising only the predicted image sensor cropping region for the respective image. Then, a first video may be produced based, at least in part, on the first cropped versions of the one or more respective images of the first plurality of images.

18 Claims, 7 Drawing Sheets

SENSOR CROPPED VIDEO IMAGE STABILIZATION (VIS)

TECHNICAL FIELD

This disclosure relates generally to the field of image processing. More particularly, but not by way of limitation, it relates to techniques for performing predictive image sensor cropping operations to improve the performance and efficiency of video image stabilization (VIS) operations, especially for high resolution image sensors.

BACKGROUND

Handheld or personal video image capture devices often employ VIS, e.g., involving electronic image stabilization (EIS) and/or optical image stabilization (OIS) operations, on captured video images frames to stabilize the captured video. One way to stabilize a video is to track a salient feature in the image and use this as an anchor point to "cancel out" all perturbations relative to it. This approach requires a priori knowledge of the image's content to, for example, identify and track a person or other salient object in the scene.

Another approach to image stabilization searches for a "background plane" in a video sequence and uses its observed distortion to correct for camera motion. These types of techniques that involve software- and/or hardware-enabled transformations to warp a captured image so as to cancel out, i.e., stabilize, the jitter caused by camera movement after-the-fact are referred to herein as electronic image stabilization or EIS techniques. Another approach may use the output from a positional sensor, e.g., an Inertial Measurement Unit (IMU) or a gyroscope, as an input for estimating the amount (and direction) of warping that needs to be done via the EIS transformations in order to stabilize a given video image frame(s).

In yet another approach, gyroscopically controlled electromagnets (or other suitable mechanisms) may be configured to shift a floating lens element orthogonally to the lens barrel axis (i.e., the "optical axis") along the horizontal and vertical plane of the image and/or along the optical axis in a direction that is opposite that of the camera movement. Doing this can effectively neutralize any sign of camera shake. In a similar type of operation, a camera's imaging sensor may translate in the opposite direction of the camera's movements in order to dampen the effects of camera shake. These types of techniques that involve hardware-enabled corrections in the position of the image capture apparatus, e.g., by moving one or more elements in the optical stack, the image sensor itself, or the entire camera system, so as to cancel out the jitter caused by camera movement at capture time will be referred to herein as "optical image stabilization" or OIS techniques.

As mentioned above, the application of VIS is typically done by determining warping operations for each individual captured video image frame, in such a way that the resulting sequence of warped video image frames produces a stabilized video (or as closed to stabilized as possible, e.g., subject to the availability of a sufficient amount of overscan pixels around the periphery of the displayed portion of the captured video images to accommodate the determined warpings).

However, for image sensors having high resolutions (e.g., image sensors with resolutions larger than 12 megapixels (MP)), it may not always be possible (or practical), e.g., from a computational, memory, and/or thermal resources standpoint, to be able to read out and analyze all the pixels of a given video image frame at capture time to determine appropriate VIS operations. In other words, a given electronic device simply may not have enough memory or processing resources to process that many pixels in real-time.

Further, in cases of electronic devices having two or more embedded image capture devices, it may be difficult to map particular regions in the first field of view (FOV) of a first image capture device of the electronic device to a corresponding region(s) in a second (e.g., higher resolution) FOV of a second image capture device of the electronic device. Performing such mapping operations may be necessary, e.g., at moments when a user indicates a desire to transition between which image capture device is being used by the electronic device to capture images. Difficulties may arise, e.g., due to parallax shift between the two image capture devices, in addition to the different intrinsic and extrinsic properties of the two image capture devices, including resolution levels, spatial resolution, focal length, etc.

Thus, there is a need for methods, apparatuses, computer readable media, and systems to intelligently reduce (e.g., via the usage of predicted image sensor cropping regions) the number of pixels that are read into memory for a given captured video image frame that is to be stabilized and processed by an image signal processing (ISP) pipeline. As will be explained herein, the earlier in an ISP pipeline that such intelligent cropping operations may be made and the more pixels that may be discarded via such cropping operations—without prejudicing the quality of the VIS operations to be performed on the captured video image frames—the greater the efficiency gains will be in the ISP pipeline.

SUMMARY

Devices, methods, and non-transitory program storage devices are disclosed herein to perform predictive image sensor cropping operations to improve the performance of video image stabilization (VIS) operations in an image signal processing (ISP) pipeline, e.g., in terms of processing performance, memory efficiency, power, and/or thermal considerations. The techniques described herein may be especially applicable to high resolution image sensors, as well as electronic devices having two or more image capture devices with different resolutions.

According to some embodiments, there is provided a device, comprising: a memory; a first image capture device having a first image sensor with a first field view of view (FOV) and a first resolution; and one or more processors operatively coupled to the memory, wherein the one or more processors are configured to execute instructions causing the one or more processors to: receive a first request to begin capturing a first video and then cause the first image capture device to begin to capture a first video image stream, wherein the first video image stream comprises a first plurality of images captured with the first resolution. For each of one or more respective images of the first plurality of images, the one or more processors may be configured to: obtain image information corresponding to one or more images in the first plurality of images captured prior to the respective image; predict, for the respective image, and based, at least in part, on the obtained image information, an image sensor cropping region to be read out from the first image sensor; and read out, into the memory, a first cropped version of the respective image, wherein the first cropped version of the respective image comprises only the predicted image sensor cropping region for the respective image; and, finally, produce the first video based, at least in part, on the first cropped versions of the one or more respective images of the first plurality of images. If desired, additional video image stabilization operations may be performed on the produced first video, e.g., in the ISP pipeline or elsewhere by the device.

In some embodiments, the obtained image information may comprise one or more of: positional information corresponding to one or more images in the first plurality of images captured prior to the first image; saliency information corresponding to one or more images in the first plurality of images captured prior to the first image; or image registration information between one or more images in the first plurality of images captured prior to the first image and the first image.

In some embodiments, the device may further comprise a positional sensor (e.g., a gyroscope, an accelerometer, or an IMU), wherein the image information obtained for a first image of the one or more respective images of the first plurality of images comprises positional information that is obtained from the positional sensor and that corresponds to one or more images in the first plurality of images captured prior to the first image (e.g., an image captured immediately prior to the first image). In some such embodiments, the positional information corresponding to the image in the first plurality of images captured immediately prior to the first image may be used to estimate a "pointing angle" of the first image capture device during the capture of the first image (i.e., the next image that is captured), and the image sensor cropping region for the first image may be further predicted based, at least in part, on the estimated pointing angle of the first image capture device during the capture of the first image.

In some embodiments, the image sensor cropping region predicted for a given image may comprise an overscan region of a predetermined size (e.g., of predetermined dimensions based on the determined crop, or of determined dimensions plus a predetermined amount of padding pixels, such as may be described in terms of a percentage of one of the image's dimensions, etc.). In some embodiments, the image sensor cropping region predicted for each image may comprise a region having a second resolution that is less than the first resolution (e.g., less than a native resolution of the image sensor).

In still other embodiments, a "second pass" cropping operation may be performed on the predicted image sensor cropping regions, wherein the second pass cropping operation may comprise: predicting, for at least a first image of the first plurality of images, a second cropped version of the first image, wherein the second cropped version of the first image is based, at least in part, on image information obtained from one or more images in the first plurality of images captured subsequently to the first image, and wherein the first video is produced based, at least in part, on the second cropped version of the first image (i.e., rather than the "first pass" or "first" cropped version of the first image based on images captured prior to the first image).

In yet other "multi-image capture device" embodiments, the device may further comprise: a positional sensor; and a second image capture device having a second image sensor with a second FOV and a second resolution, wherein the second FOV is different than the first FOV, wherein the second resolution is different than the first resolution. The one or more processors may then be further configured to execute instructions to: cause the second image capture device to begin to capture a second video image stream, wherein the second video image stream comprises a second plurality of images captured with the second resolution. Then, for at least a first image captured of the second plurality of images, the one or more processors may: obtain positional image information from the positional sensor corresponding to a last image captured in the first plurality of images (i.e., those captured previously by a first image capture device of the device); predict, based at least in part, on the obtained positional information and a projection operation of the first FOV of the first image sensor into the second FOV of the second image sensor, an image sensor cropping region for the first image; and then read out, into the memory, a second cropped version of the first image, wherein the second cropped version of the first image comprises only the predicted image sensor cropping region for the first image. Finally, the first video may be produced further based, at least in part, on the second cropped version of the first image.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1:
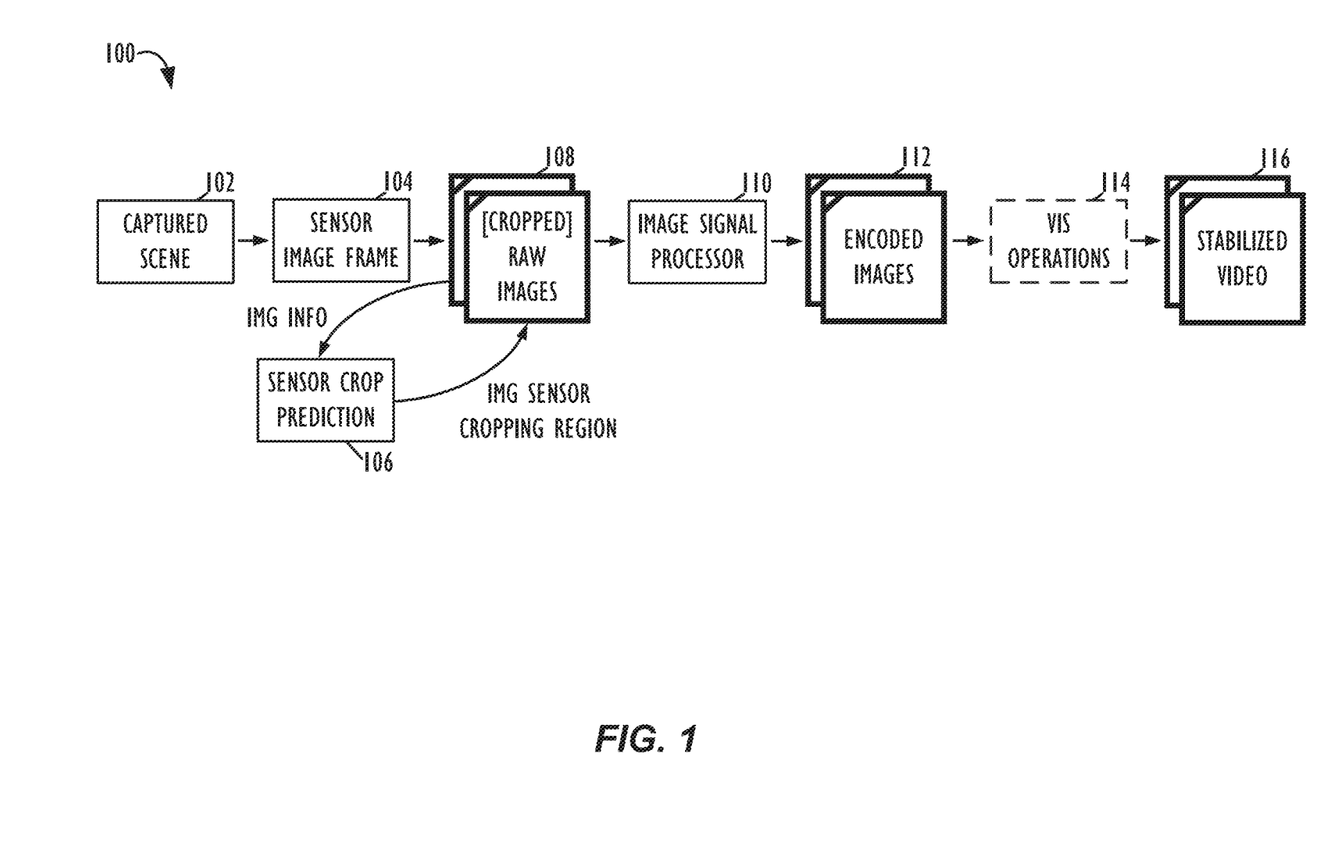
FIG. 1 illustrates an example of performing predictive image sensor cropping in an image signal processing pipeline, according to various embodiments.

Exemplary Image Signal Processing (ISP) Pipeline for Performing Sensor Cropped Video Image Stabilization (VIS) Operations Turning now to FIG. 1, an example of an image signal processing (ISP) pipeline 100 for performing predictive image sensor cropping is shown, according to various embodiments. According to example ISP pipeline 100, a captured scene (102) is being captured by a particular image sensor of an image capture device, wherein the pixels captured by the image sensor for a given image frame are represented in FIG. 1 by sensor image frame 104. Sensor image frame 104 may comprise an array of one or more forms of light intensity information for every pixel on the image sensor. Typically, the image information read out from an image sensor for a given image frame is referred to as a "RAW" image 108 (i.e., image data that is otherwise uncompressed and minimally processed after being read out directly from the image sensor). RAW image data may be stored directly to a device's memory (e.g., dynamic random access memory or "DRAM").

However, image sensors often have capability deficiencies in terms of flexibility, formatting, speed, memory bandwidth requirements, etc., and—especially in the case of very high resolution image sensors—may also be power-intensive and generate large amounts of thermal energy. Thus, it would be desirable to limit the number of pixels being read from the image sensor for any given captured video image frame—while still providing sufficient "overscan" (i.e., extra pixels around the periphery of the actual captured pixels that are intended to be displayed to a user), such that satisfactory VIS operations may be performed in the ISP pipeline on the captured video image frames. For image sensors with very high resolutions, it may be even more crucial to intelligently and dynamically determine the sensor cropping regions for each captured video image frame to save additional processing, memory, thermal, and/or power resources.

Thus, according to example ISP pipeline 100, a sensor crop prediction module 106 may be included in the pipeline 100 and configured to analyze image information from other images in the captured video image stream in order to more intelligently and dynamically predict image sensor cropping regions to be read off the image sensor. As will be explained below, in some embodiments, the image information analyzed may come from an image frame captured prior (e.g., immediately prior) to the current image frame for which the image sensor cropping region is being determined. In some embodiments, the analyzed image information from the prior image frame may comprise positional information, wherein the positional information may be used to estimate a pointing angle of the image capture device during the capture of the current image (e.g., a pointing angle represented in the form of a so-called "next step" quaternion). By knowing the direction in which the image capture device is presently pointing, a more targeted and precise sensor cropping region for the current image may be predicted by sensor crop prediction module 106. Once a sensor cropping region has been predicted, then only a cropped version of the RAW image 108 need be read off the image sensor and into memory. As described above, the more pixels that can safely be eliminated at this crop prediction stage, the more efficiencies that may be gained across the entire ISP pipeline 100. Information from image frames that were captured before the current image upon which cropping decisions may be based are also referred to as "pre-causal" information.

The cropped versions of the RAW images 108 may then be transmitted to image signal processor 110 for any desired additional image processing, such as compression, demosaicing, white balancing, tone mapping, encoding into a different image format (e.g., a YCbCr color space), and so forth. If desired, additional "finer grained" cropping passes may be performed on the RAW image data before being sent to image signal processor 110, e.g., leveraging information from additional video image frames that may have been captured by the image sensor by the time the image data for a given image is being transmitted to image signal processor 110, e.g., allowing the ISP pipeline to consider information coming from 1 image frame, 2 image frames, or 5 image frames, etc., after the capture of the current image frame.

The encoded images 112 may then be subjected to any further VIS operations 114 that are desired in a given implementation. For example, VIS operations 114 may be performed by a GPU, or by software and/or hardware components of ISP 110, and may have the advantage of increased flexibility, such as the ability to "look ahead" at a greater number of captured video image frames (e.g., as may be stored in a frame ring buffer) when determining VIS smoothing/warping decisions for a given captured video image frame. Finally, the cropped and stabilized images may then be encoded into a final produced stabilized video 116, in a desired video format, resolution, color space, etc. If desired, the video may be upscaled (e.g., to 4k resolution, 8k resolution, etc.) before being produced in the final video format utilizing a relatively minimal thermal/power budget.

Exemplary Center Locked and Non-Center Locked Image Sensor Cropping Schemes

Figure 2:
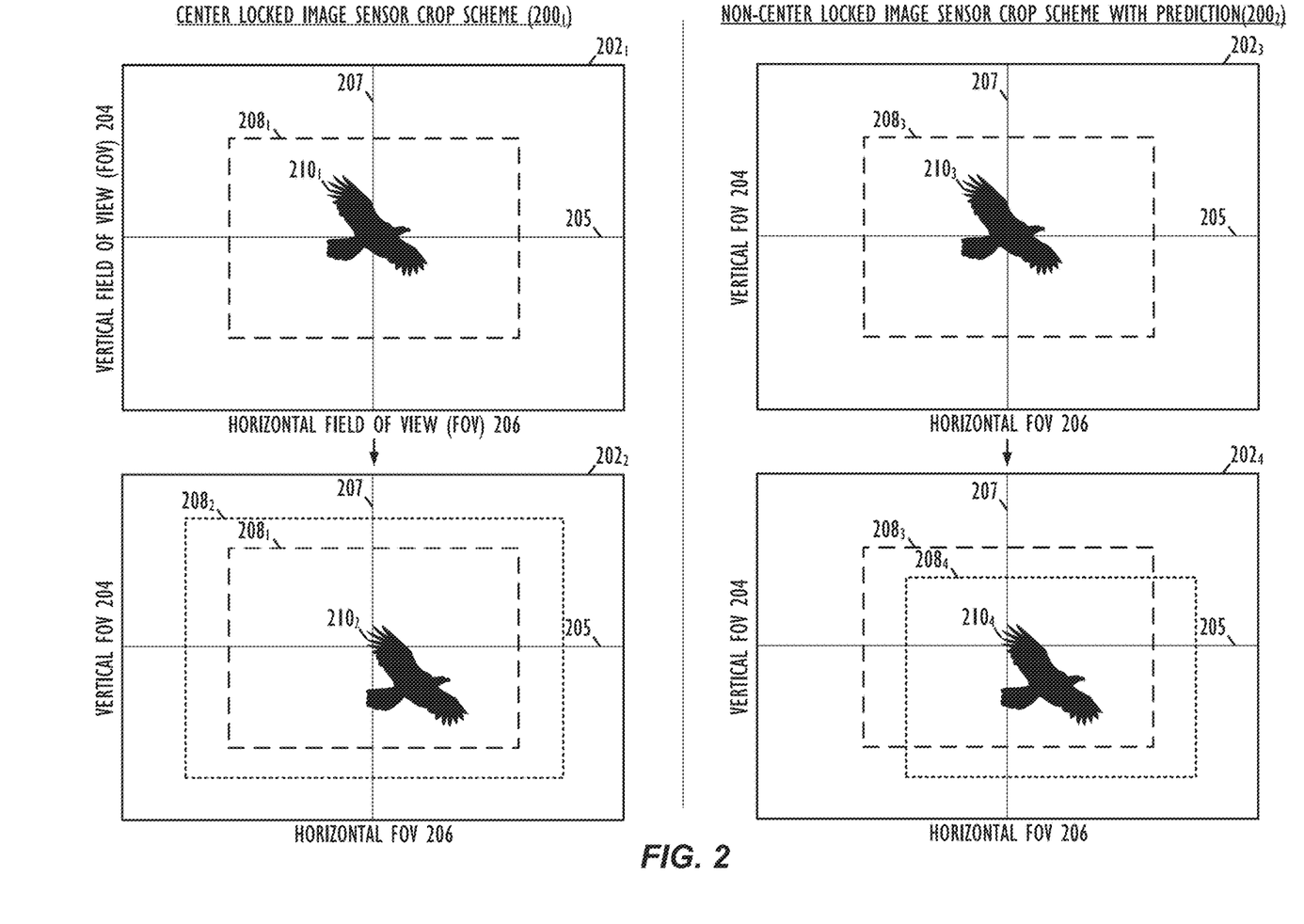
FIG. 2 illustrates examples of center locked and non-center locked image sensor cropping, according to various embodiments.

Turning now to FIG. 2, examples of center locked ($200_1$) and non-center locked ($200_2$) image sensor cropping schemes are illustrated, according to various embodiments. Looking first at center locked image sensor cropping scheme $200_1$, an exemplary captured sensor image frame $202_1$ has an exemplary vertical FOV 204 and an exemplary horizontal FOV 206. Central axes 205 and 207 indicate the central horizontal and vertical axes, respectively, of the captured sensor image frame. In this example, bird $210_1$ represents an exemplary salient image feature in the captured video image frame whose motion is being stabilized between sensor image frame $202_1$ and sensor image frame $202_2$. In this example, image sensor cropping region $208_1$ represents the region from the image sensor that is predicted to be needed to maintain VIS stabilization in the captured video image stream. (It is to be understood that the relative dimensions and sizes of the various images and cropping and overscan regions in FIG. 2 are shown only for illustrative purposes, and do not necessarily represent dimensions that would be used in a real implementation.)

Moving down to a hypothetical next image that is captured, i.e., sensor image frame $202_2$, it is illustrated that the bird has moved to the new position of bird $210_2$ within the sensor image frame. Thus, assuming a center locked image sensor cropping scheme $200_1$, it may now be understood that the image sensor cropping region $208_2$ represents the increased region from the image sensor that is predicted to be needed to maintain VIS stabilization in the captured video image stream. As may now be appreciated, the more movement there is in the captured video image stream that needs to be stabilized, the larger and larger the regions will be that need to be cropped from the image sensor in order to maintain VIS stabilization. For at least the various reasons described above, this leads to inefficient performance for the capturing device, and would preferably be improved upon.

Turning now to non-center locked image sensor cropping scheme $200_2$, again, the exemplary captured sensor image frame $202_3$ has an exemplary vertical FOV 204 and an exemplary horizontal FOV 206, and central axes 205 and 207 still indicate the central horizontal and vertical axes, respectively, of the captured sensor image frame. In this example, bird $210_3$ again represents the salient image feature in the captured video image frame whose motion is being stabilized between sensor image frame $202_3$ and sensor image frame $202_4$. As with the sensor image frame $202_1$ example described above, before any initial movement of bird $210_3$, image sensor cropping region $208_3$ represents the region from the image sensor that is predicted to be needed to maintain VIS stabilization in the captured video image stream. (It is to be understood that the relative dimensions and sizes of the image sensor cropping region $208_1$ and image sensor cropping region $208_3$ across the various examples $200_1$ and $200_2$ are essentially identical.)

Again, when moving down to a hypothetical next image that is captured, i.e., sensor image frame $202_4$, it is illustrated that the bird has moved to the new position shown by bird $210_4$ (which is the same as the updated position of bird $210_2$ within sensor image frame $202_2$). However, assuming a non-center locked image sensor cropping scheme $200_2$, it may now be understood that the image sensor cropping region $208_4$ represents a region from the image sensor that is the same size as the initial image sensor cropping region $208_3$ in this example. The difference is that the location of the updated image sensor cropping region $208_4$ represents an intelligent prediction (e.g., as would be made by sensor crop prediction module 106 of FIG. 1) of an image sensor region of the same size that could still be used to maintain VIS stabilization in the captured video image stream (i.e., due to its more intelligent placement withing the captured video image frame, e.g., as predicted based upon an estimated pointing direction of the image capture device during the capture of sensor image frame $202_4$). As may now be appreciated, despite the greater amount of movement in the captured video image stream that needs to be stabilized, the same size image sensor regions is able to be cropped and read out from the image sensor, while still maintaining VIS stabilization. For at least the various reasons described above, this leads to improved performance and efficiency for the capturing device, in terms of computations, memory, thermal, and power resources utilized. In this way, the benefits of the increased resolution of the image sensor used in this example may be enjoyed—without exceeding the device's available memory, processing, power, and/or thermal resources.

Exemplary Image Sensor Cropping Prediction Projection Operations

Figure 3:
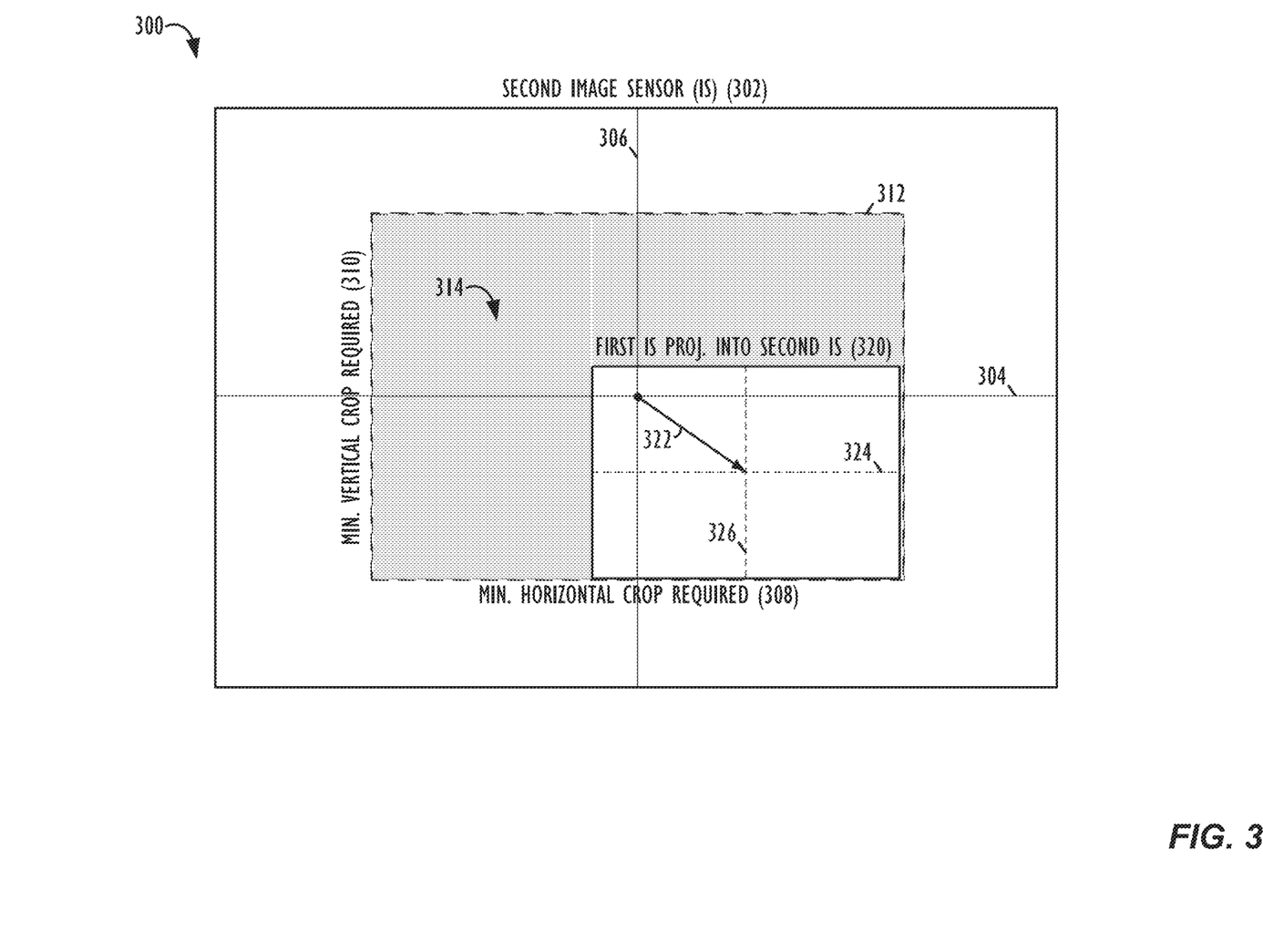
FIG. 3 illustrates an example of projecting a predicted image sensor cropping region from a first image sensor's space into a second image sensor's space, according to various embodiments.

Turning now to FIG. 3, an example 300 of projecting a predicted image sensor cropping region from a first image sensor's space into a second image sensor's space is illustrated, according to various embodiments. The second image sensor's space 302 is represented by the larger rectangle in FIG. 3, and central axes 304 and 306 indicate the central horizontal and vertical axes, respectively, of second image sensor 302. Similarly, the first image sensor's space 320 is represented by the smaller rectangle in FIG. 3, and central axes 324 and 326 indicate the central horizontal and vertical axes, respectively, of first image sensor 320.

In this example, in order to project from the first image sensor's space 320 into the second image sensor's space 302, a minimum required cropping window 312 from the second image sensor's space 302 is determined, having a minimum horizontal crop (308) and a minimum vertical crop (310) that are needed to ensure there is enough of the second image sensors space 302 available for the projection operation to be applied to the first image sensor's space 320. In this example the determined projection from the first image sensor's space into the second image sensor's space is represented by arrow 322. The fact that the center of first image sensor space 320 exhibits drift from the center of second image sensor space 302 may be a result of parallax, distortion, other intrinsic or extrinsic models and/or lens models associated with the first and second images sensors, respectively, as well as their relative positions embedded within a common electronic device.

In the example of FIG. 3, it may be seen that cropping window 312 represents a minimum centered cropping window required to completely enclose the projection of the first image sensor space 320. As may thus be appreciated, shaded region 314 represents a region that may be read out from the second image sensor, but then cropped out in the ISP pipeline, as it will have been determined that none of the pixels in shaded region 314 will correspond to pixels from the first image sensor, e.g., at the moment a user indicates a desire to transition from capturing video image frames with the first image sensor to instead capturing the video image frames with the second image sensor.

Figure 4A:
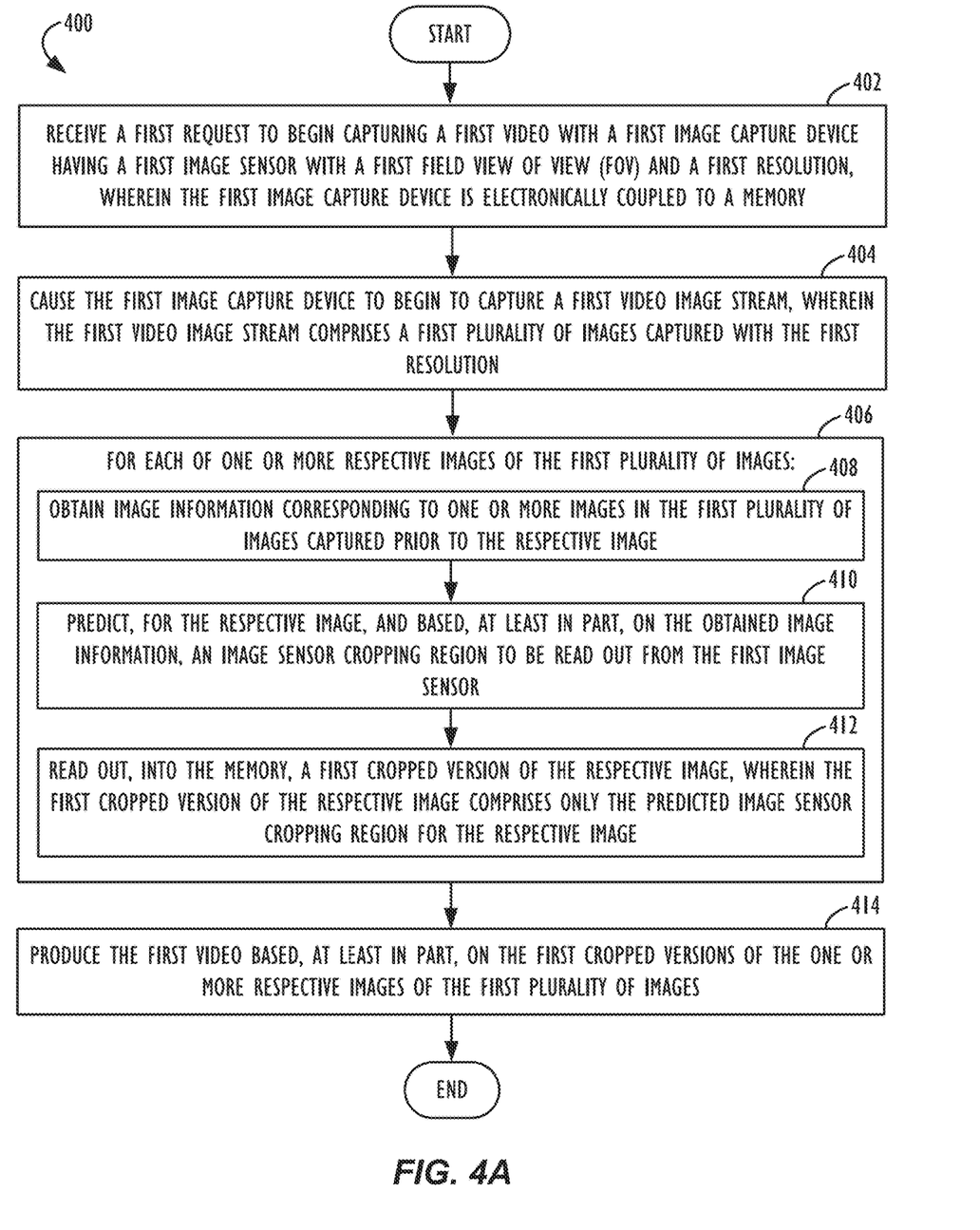
FIGS. 4A-4C are flow charts illustrating methods of performing predictive image sensor cropping in an image signal processing pipeline to produce a stabilized video, according to various embodiments.
Figure 4B:
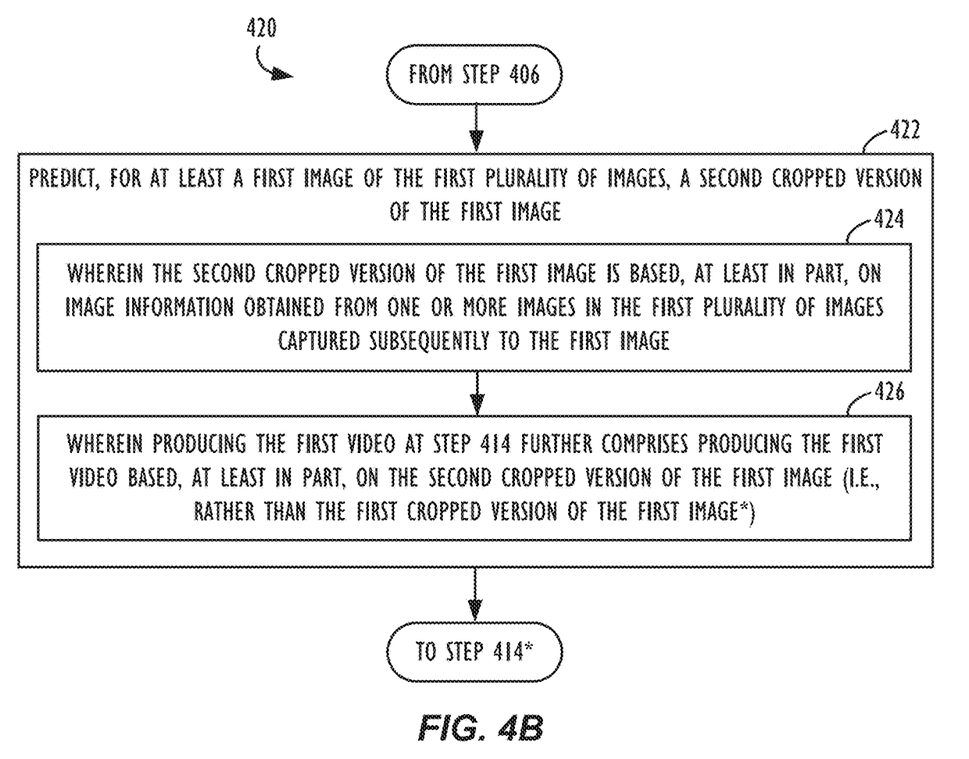
Figure 4C:
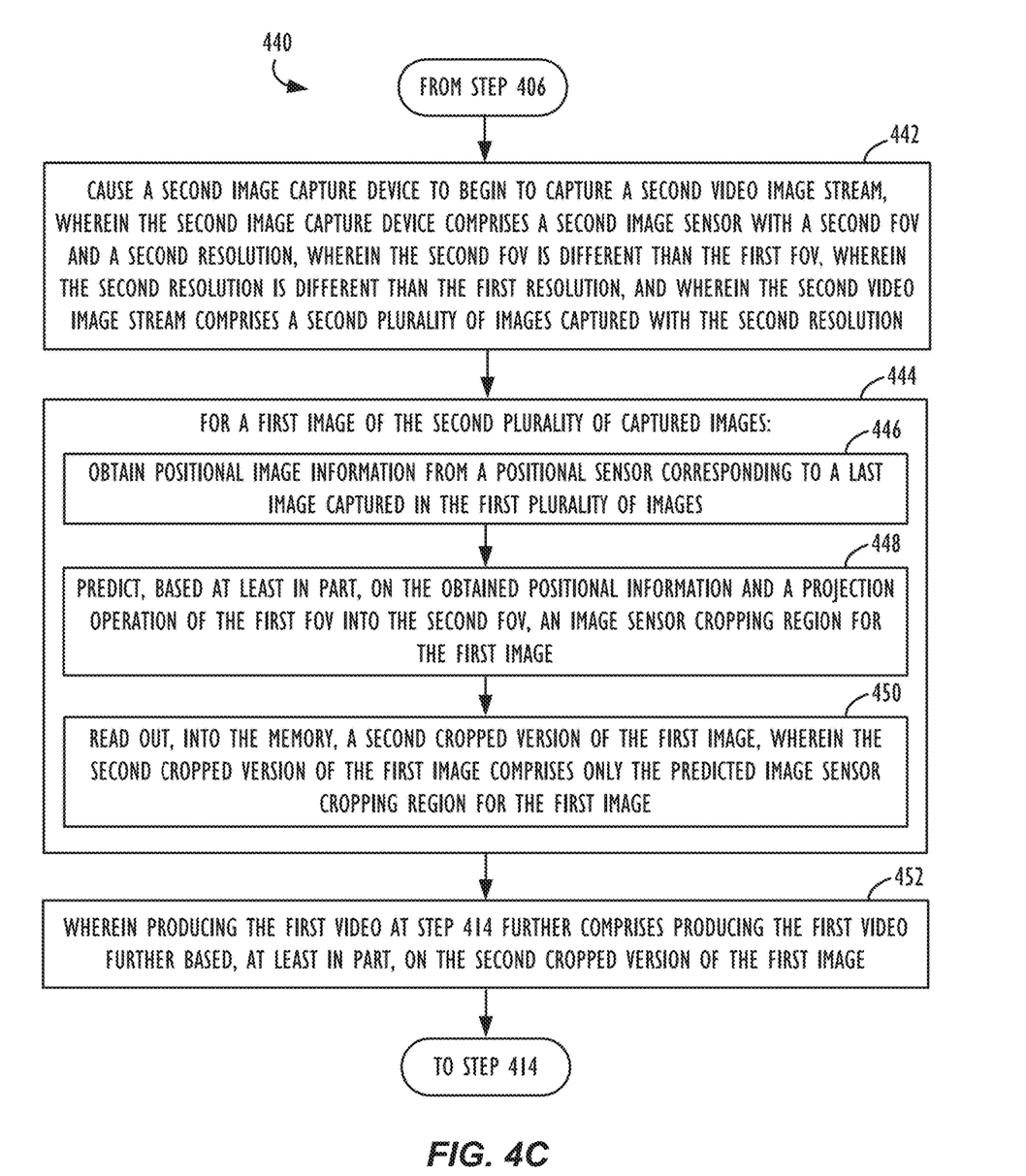

Exemplary Methods for Performing Predictive Image Sensor Cropping in an ISP Pipeline to Produce Stabilized Video FIGS. 4A-4C are flow charts illustrating methods of performing predictive image sensor cropping in an image signal processing pipeline to produce a stabilized video, according to various embodiments.

Turning first to FIG. 4A, a method 400 is illustrated for performing predictive image sensor cropping in an image signal processing pipeline to produce a stabilized video. First, at Step 402, the method 400 may receive a first request to begin capturing a first video with a first image capture device having a first image sensor with a first field view of view (FOV) and a first resolution, wherein the first image capture device is electronically coupled to a memory. Next, at Step 404, the method 400 may cause the first image capture device to begin to capture a first video image stream, wherein the first video image stream comprises a first plurality of images captured with the first resolution.

A for-loop may be initiated at Step 406, wherein, for each of one or more respective images of the first plurality of images, the method 400 may: obtain image information corresponding to one or more images in the first plurality of images captured prior to the respective image (Step 408); predict, for the respective image, and based, at least in part, on the obtained image information, an image sensor cropping region to be read out from the first image sensor (Step 410); and read out, into the memory, a first cropped version of the respective image, wherein the first cropped version of the respective image comprises only the predicted image sensor cropping region for the respective image (Step 412). As described above, by using image information (e.g., positional information obtained from a positions sensor) associated with an image(s) captured previously to a given image, a prediction may be made of a smaller cropped region (and a much smaller cropped region, in the case of very high resolution image sensors) of the image sensor that may be read out into memory, in order to still have enough "overscan" or extra pixels around the periphery of the image frame to provide satisfactory amounts of video image stabilization and keep relevant objects within the images of the produced video. It is to be understood that the steps described in method 400 may also need to be performed in conjunction with (and taking into account) any additional OIS or other hardware-based image stabilization that the electronic device with the embedded image capture devices may be performing.

Turning now to FIG. 4B, a method 420 is illustrated providing further details to the method 400 of performing predictive image sensor cropping, by further enhancing the process that was first introduced above in FIG. 4A. First, at Step 422, the method 420 may continue operations from Step 406 of FIG. 4A by predicting, for at least a first image of the first plurality of images, a second cropped version of the first image, wherein the second cropped version of the first image is based, at least in part, on image information obtained from one or more images in the first plurality of images captured subsequently to the first image (Step 424), and wherein producing the first video at Step 414 further comprises producing the first video based, at least in part, on the second cropped version of the first image, i.e., rather than the first cropped version of the first image (Step 426). As mentioned above, with the additional image information obtained from one or more images in the first plurality of images captured subsequently to the first image, even more aggressive image sensor cropping regions may be predicted (i.e., based on the increased knowledge of the upcoming image content in the first video image stream), thereby further improving performance and efficiency of the ISP pipeline by operating on fewer pixels per captured image.

Turning now to FIG. 4C, a method 440 is illustrated providing further details to the method 400 of performing predictive image sensor cropping, enhancing the process that was first introduced above in FIG. 4A by allowing predicted image sensor cropping regions to be projected into the capture space of another image sensor, e.g., in cases where a single electronic device has two or more embedded image capture devices with different properties. First, at Step 442, the method 440 may continue operations from Step 406 of FIG. 4A. As a reminder, Step 406 comprises the method 400 reading out, into the memory, a first cropped version of each respective image, wherein the first cropped version of the respective image comprises only the predicted image sensor cropping region for the respective image.

According to the method 440, at Step 442, the operations may further comprise causing a second image capture device to begin to capture a second video image stream, wherein the second image capture device comprises a second image sensor with a second FOV and a second resolution, wherein the second FOV is different than the first FOV, wherein the second resolution is different than the first resolution, and wherein the second video image stream comprises a second plurality of images captured with the second resolution.

Next, at Step 444, for a first image of the second plurality of captured images, the method 440 may: obtain positional image information from a positional sensor corresponding to a last image captured in the first plurality of images (Step 446); predict, based at least in part, on the obtained positional information and a projection operation of the first FOV into the second FOV, an image sensor cropping region for the first image (Step 448); and read out, into the memory, a second cropped version of the first image, wherein the second cropped version of the first image comprises only the predicted image sensor cropping region for the first image (Step 450). As described above, by performing a projection operation between the first FOV and the second FOV the pixels representing the same "portion" of the captured scene may be mapped over to their corresponding location within the second FOV of the second image capture device, such that the cropping prediction operations may continue seamlessly, using the second image capture device. Finally, at Step 452, it is specified that producing the first video at Step 414 further comprises producing the first video further based, at least in part, on the second cropped version of the first image, i.e., the determined cropping region as projected into the second FOV of the second image capture device. It is to be understood that the details described above in reference to FIGS. 4B and 4C are optional enhancements to the method described in FIG. 4A, and that certain steps of FIGS. 4A-4C may be performed optionally or in an alternative order, without departing from the scope of the disclosed inventions.

Exemplary Electronic Computing Devices

Figure 5:
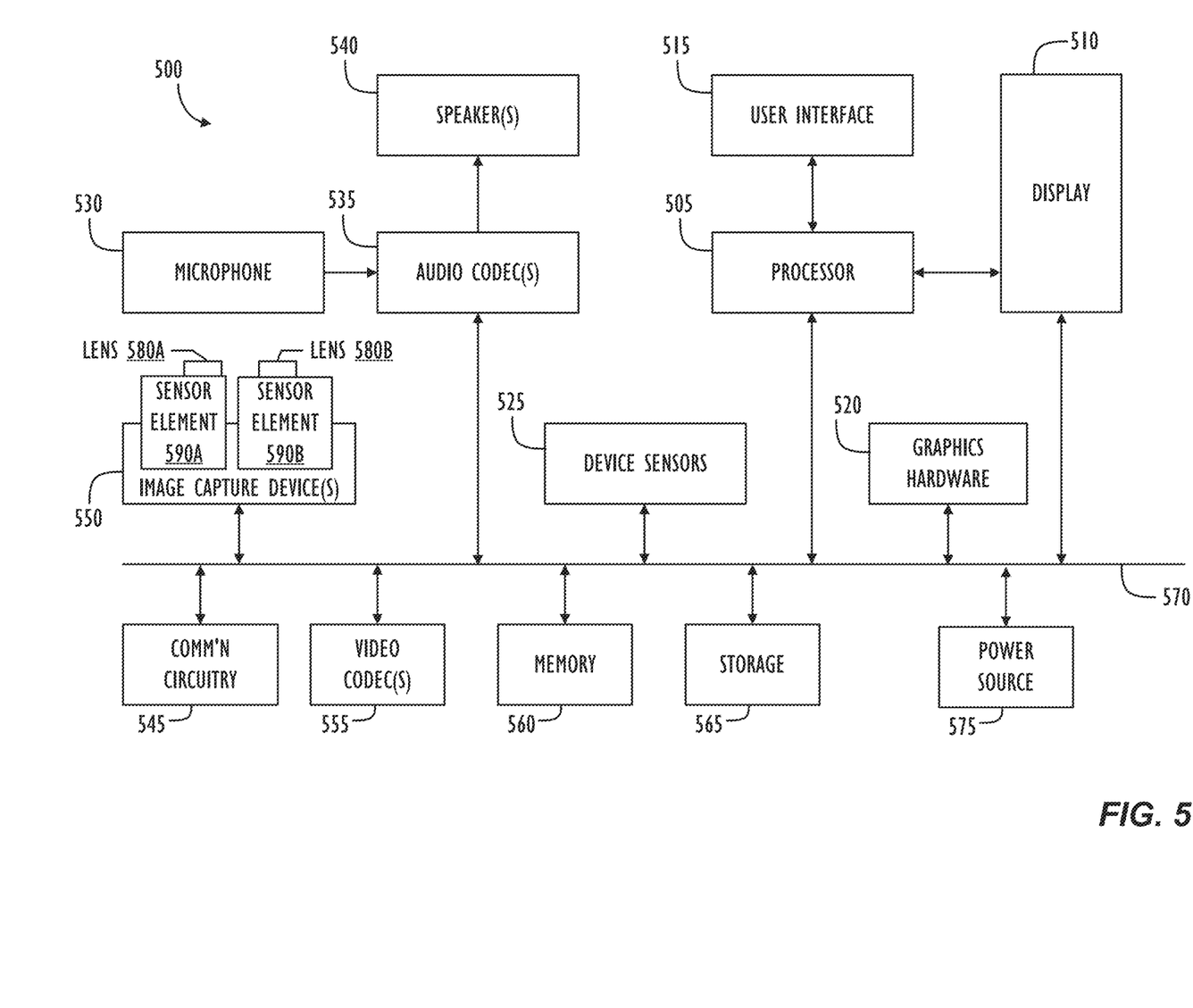
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device(s) 550, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 550 may comprise one or more camera units configured to capture images, e.g., images which may be processed to help further improve the efficiency of VIS operations, e.g., in accordance with this disclosure. Image capture device(s) 550 may include two (or more) lens assemblies 580A and 580B, where each lens assembly may have a separate focal length. For example, lens assembly 580A may have a shorter focal length relative to the focal length of lens assembly 580B. Each lens assembly may have a separate associated sensor element, e.g., sensor elements 590A/590B. Alternatively, two or more lens assemblies may share a common sensor element. Image capture device(s) 550 may capture still and/or video images. Output from image capture device(s) 550 may be processed, at least in part, by video codec(s) 555 and/or processor 505 and/or graphics hardware 520, and/or a dedicated image processing unit or image signal processor incorporated within image capture device(s) 550. Images so captured may be stored in memory 560 and/or storage 565.

Memory 560 may include one or more different types of media used by processor 505, graphics hardware 520, and image capture device(s) 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
a first image capture device having a first image sensor with a first field view of view (FOV) and a first resolution;
a positional sensor;
a second image capture device having a second image sensor with a second FOV and a second resolution, wherein the second FOV is different than the first FOV, and wherein the second resolution is different than the first resolution; and
one or more processors operatively coupled to the memory, wherein the one or more processors are configured to execute instructions causing the one or more processors to:
receive a first request to begin capturing a first video;
cause the first image capture device to begin to capture a first video image stream, wherein the first video image stream comprises a first plurality of images captured with the first resolution;
for each of one or more respective images of the first plurality of images:
obtain image information corresponding to one or more images in the first plurality of images captured prior to the respective image;
predict, for the respective image, and based, at least in part, on the obtained image information, an image sensor cropping region to be read out from the first image sensor; and
read out, into the memory, a first cropped version of the respective image, wherein the first cropped version of the respective image comprises only the predicted image sensor cropping region for the respective image; and
cause the second image capture device to begin to capture a second video image stream, wherein the second video image stream comprises a second plurality of images captured with the second resolution;
for at least a first image of the second plurality of images:
obtain positional image information from the positional sensor corresponding to a last image captured in the first plurality of images;
predict, based at least in part, on the obtained positional information and a projection operation of the first FOV into the second FOV, an image sensor cropping region for the first image of the second plurality of images; and
read out, into the memory, a second cropped version of the first image of the second plurality of images, wherein the second cropped version of the first image of the second plurality of images comprises only the predicted image sensor cropping region for the first image of the second plurality of images; and
produce the first video based, at least in part, on the first cropped versions of the one or more respective images of the first plurality of images and the second cropped version of the first image of the second plurality of images.

2. The device of claim 1, wherein the image information obtained for a first image of the first plurality of images comprises:
positional information obtained from the positional sensor and corresponding to one or more images in the first plurality of images captured prior to the first image of the first plurality of images.

3. The device of claim 2, wherein the positional sensor comprises at least one of: a gyroscope, an accelerometer, or an Inertial Measurement Unit (IMU).

4. The device of claim 2, wherein the positional information corresponding to one or more images in the first plurality of images captured prior to the first image of the first plurality of images comprises positional information corresponding to an image in the first plurality of images captured immediately prior to the first image of the first plurality of images.

5. The device of claim 4, wherein:
the positional information corresponding to the image in the first plurality of images captured immediately prior to the first image of the first plurality of images is used to estimate a pointing angle of the first image capture device during the capture of the first image of the first plurality of images, and
the image sensor cropping region for the first image of the first plurality of images is further predicted based, at least in part, on the estimated pointing angle of the first image capture device during the capture of the first image of the first plurality of images.

6. The device of claim 1, wherein the image information obtained for a first image of the first plurality of images comprises one or more of:
positional information corresponding to one or more images in the first plurality of images captured prior to the first image of the first plurality of images;
saliency information corresponding to one or more images in the first plurality of images captured prior to the first image of the first plurality of images; or
image registration information between one or more images in the first plurality of images captured prior to the first image and the first image of the first plurality of images.

7. The device of claim 1, wherein the image sensor cropping region predicted for each respective image further comprises an overscan region of a predetermined size.

8. The device of claim 1, wherein the image sensor cropping region predicted for each respective image comprises a region having a second resolution, wherein the second resolution is less than the first resolution.

9. The device of claim 1, wherein the image sensor cropping region predicted for each respective image comprises a region determined, at least in part, by performing a projection operation, and wherein the projection operation is based, at least in part, on one or more intrinsic calibration parameters of the first image capture device.

10. The device of claim 1, wherein the one or more processors are further configured to execute instructions causing the one or more processors to:
predict, for at least a first image of the first plurality of images, a second cropped version of the first image of the first plurality of images,
wherein the second cropped version of the first image of the first plurality of images is based, at least in part, on image information obtained from one or more images in the first plurality of images captured subsequently to the first image of the first plurality of images, and
wherein the instructions to produce the first video further comprise instructions to produce the first video based, at least in part, on the second cropped version of the first image of the first plurality of images.

11. The device of claim 1, wherein the one or more processors are further configured to execute instructions causing the one or more processors to:

perform a video image stabilization (VIS) operation on the produced first video.

12. A non-transitory program storage device comprising instructions stored thereon to cause one or more processors to:
receive a first request to begin capturing a first video with a first image capture device having a first image sensor with a first field view of view (FOV) and a first resolution, wherein the first image capture device is electronically coupled to a memory;
cause the first image capture device to begin to capture a first video image stream, wherein the first video image stream comprises a first plurality of images captured with the first resolution;
for each of one or more respective images of the first plurality of images:
obtain image information corresponding to one or more images in the first plurality of images captured prior to the respective image;
predict, for the respective image, and based, at least in part, on the obtained image information, an image sensor cropping region to be read out from the first image sensor; and
read out, into the memory, a first cropped version of the respective image, wherein the first cropped version of the respective image comprises only the predicted image sensor cropping region for the respective image;
predict, for at least a first image of the first plurality of images, a second cropped version of the first image, wherein the second cropped version of the first image is based, at least in part, on image information obtained from one or more images in the first plurality of images captured subsequently to the first image; and
produce the first video based, at least in part, on the first cropped versions of the one or more respective images of the first plurality of images and the second cropped version of the first image.

13. The non-transitory program storage device of claim 12, wherein the image information obtained for the first image of the one or more respective images of the first plurality of images comprises one or more of: positional information corresponding to one or more images in the first plurality of images captured prior to the first image;
saliency information corresponding to one or more images in the first plurality of images captured prior to the first image; or
image registration information between one or more images in the first plurality of images captured prior to the first image and the first image.

14. An image processing method, comprising:
receiving a first request to begin capturing a first video with a first image capture device having a first image sensor with a first field view of view (FOV) and a first resolution, wherein the first image capture device is electronically coupled to a memory;
causing the first image capture device to begin to capture a first video image stream, wherein the first video image stream comprises a first plurality of images captured with the first resolution;
for each of one or more respective images of the first plurality of images:
obtaining image information corresponding to one or more images in the first plurality of images captured prior to the respective image;

predicting, for the respective image, and based, at least in part, on the obtained image information, an image sensor cropping region to be read out from the first image sensor; and reading out, into the memory, a first cropped version of the respective image, wherein the first cropped version of the respective image comprises only the predicted image sensor cropping region for the respective image;

predicting, for at least a first image of the first plurality of images, a second cropped version of the first image, wherein the second cropped version of the first image is based, at least in part, on image information obtained from one or more images in the first plurality of images captured subsequently to the first image; and producing the first video based, at least in part, on the first cropped versions of the one or more respective images of the first plurality of images and the second cropped version of the first image.

15. The method of claim 14, wherein the image information obtained for the first image of the one or more respective images of the first plurality of images comprises one or more of:

positional information corresponding to one or more images in the first plurality of images captured prior to the first image;

saliency information corresponding to one or more images in the first plurality of images captured prior to the first image; or image registration information between one or more images in the first plurality of images captured prior to the first image and the first image.

16. The method of claim 14, wherein the image sensor cropping region predicted for each respective image further comprises an overscan region of a predetermined size.

17. The method of claim 14, wherein the image sensor cropping region predicted for each respective image comprises a region having a second resolution, wherein the second resolution is less than the first resolution.

18. The method of claim 14, wherein the image sensor cropping region predicted for each respective image comprises a region determined, at least in part, by performing a projection operation, and wherein the projection operation is based, at least in part, on one or more intrinsic calibration parameters of the first image capture device.

* * * * *